Sept. 4, 1934.  G. J. BLUM  1,972,327

POWER HACKSAW

Filed Sept. 2, 1930  5 Sheets-Sheet 3

Inventor
George J. Blum
By Chindahl, Parker & Carlson
Attys

Sept. 4, 1934.       G. J. BLUM       1,972,327
POWER HACKSAW
Filed Sept. 2, 1930       5 Sheets-Sheet 5

Patented Sept. 4, 1934

1,972,327

UNITED STATES PATENT OFFICE 1,972,327

POWER HACKSAW

George J. Blum, Chicago, Ill., assignor to Armstrong-Blum Mfg. Co., Chicago, Ill., a corporation of Illinois Application September 2, 1930, Serial No. 479,268

27 Claims. (Cl. 29—73)

The invention relates to power hacksaws of the type shown in Patent No. 1,201,244, issued to me on October 17, 1916. This patent discloses a machine tool for sawing bars of metal or other material into desired lengths, the machine being entirely automatic so that it is only necessary to place a bar of material in the machine, make the proper adjustments, and start the operation.

The machine disclosed in the patent has a mechanism for feeding the saw downwardly through the work, by which the rate of feed is varied according to the resistance offered to the saw blade by the material being cut, the feed being greatest when the blade is approaching the material and decreasing when the blade is cutting in hard material, or when the blade has a relatively large part of its length in cutting contact with the material, or when the blade has become dulled.

One of the principal objects of the present invention is to provide a machine of this type having a feeding mechanism adapted to impart a feeding movement which decreases automatically with the resistance offered by the above-mentioned factors, but only to a predetermined point, when an augmenting feeding pressure is applied.

Another object is to provide a machine of this character having a feeding mechanism including a yieldable actuator, tending to impart a large feeding movement, combined with an auxiliary actuator positive in character for augmenting the feeding pressure and thus insure a minimum depth of penetration.

Still another object is to provide a machine having a feed mechanism of this character in which the auxiliary actuator is adjustable to vary the amount of feed effected thereby.

Another object is to provide a hacksaw of this character having a construction permitting the feeding movement of the head to be smooth and completely responsive to the conditions of cutting.

Still another object is to provide a means for positively throwing out the feeding mechanism at both the upper and lower ends of a predetermined maximum stroke.

A still further object is to provide a hacksaw which, while being fully automatic in its operation, may also be adjusted so that a single cut may be made and the machine stopped automatically.

Another object is to provide a novel mechanism for readily adjusting the work-holding means operable by a hand lever, said means being automatically opened and closed at the proper time to release and to clamp the material being cut.

Other objects and advantages will become apparent from the following description taken in connection with the accompanying drawings, in which.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The machine in general

As disclosed in my said prior patent, the machine comprises a main frame including a base 30 having an upright 31. Mounted for vertical movement on this upright is a horizontally extending bracket 32 providing a support for a horizontally reciprocatory frame 33 having depending arms 34 for supporting a saw blade and disclosed in my Patent, No. 1,919,232, issued on July 25, 1933. Vertical movement is imparted to the bracket and thereby to the frame through the medium of a feed screw 42 arranged to be actuated in opposite directions by a pawl and ratchet mechanism generally designated by the numeral 35.

Reciprocatory motion is imparted to the saw frame 33 by means of a crank arm 39 (Fig. 3) oscillated in the rotation of a shaft 37 and connected to the frame by means of a rod 36. Also actuation of the pawl and ratchet feed mechanism 35 is effected from said shaft 37 by means of a lever 45 fulcrumed between its ends (Fig. 3) and connected at one end by means of a link 41 with the crank arm 39. The other end of the lever 45 has a pivotal connection with a rack bar 44, the latter constituting the driver for the pawl and ratchet mechanism 35. Inasmuch as this actuating mechanism is generally of the same character as that set forth in my said prior patent, a detailed description thereof is deemed unnecessary.

Feeding mechanism

The pawl and ratchet mechanism for actuating the feed screw 42 includes, as in the case of the aforementioned patent, a ratchet wheel 53 (Fig. 6) having a non-positive or frictional driving connection with the feed screw and constituting, together with an actuating pawl 62, the main actuator for effecting a downward feeding movement of the saw frame. Also said mechanism includes a return actuator including a ratchet wheel 50 and a driving pawl 61 therefor, the ratchet wheel having a positive driving connection with the feed screw. In addition to such actuators, the present invention provides an auxiliary actuator operative to augment the feeding pressure exerted by the main actuator to insure a predetermined depth of penetration of the work by the saw, and preferably this auxiliary actuator is positive in character and operative near the end of each stroke of the reciprocatory actuating mechanism.

The main and return actuators of the feed mechanism are constructed substantially in accordance with my said prior patent. Thus, the ratchet wheel 53 of the main actuator has a frictional driving connection with the ratchet wheel 50 of the return actuator, which latter is pinned to the feed screw; and the driving pawls 62 and 61 for said ratchet wheels are mounted in a shiftable carrier which is oscillated in the reciprocation of the rack bar 44, the carrier for this purpose being mounted on a crank arm 48 rigid with a gear segment 47 which meshes with the rack bar 44. Thus, the driving pawls make one complete reciprocation for each reciprocation of the saw frame.

The pawl carrier, as in the former construction, is in the form of a generally U-shaped member 64 having its opposed ends mounted to turn on a pin 60 disposed vertically on the free end of the crank arm 48, the latter being constructed to provide a rigid frame member 49 in which the upper and lower ends of the pin are mounted.

Figures 9, 10, 11:
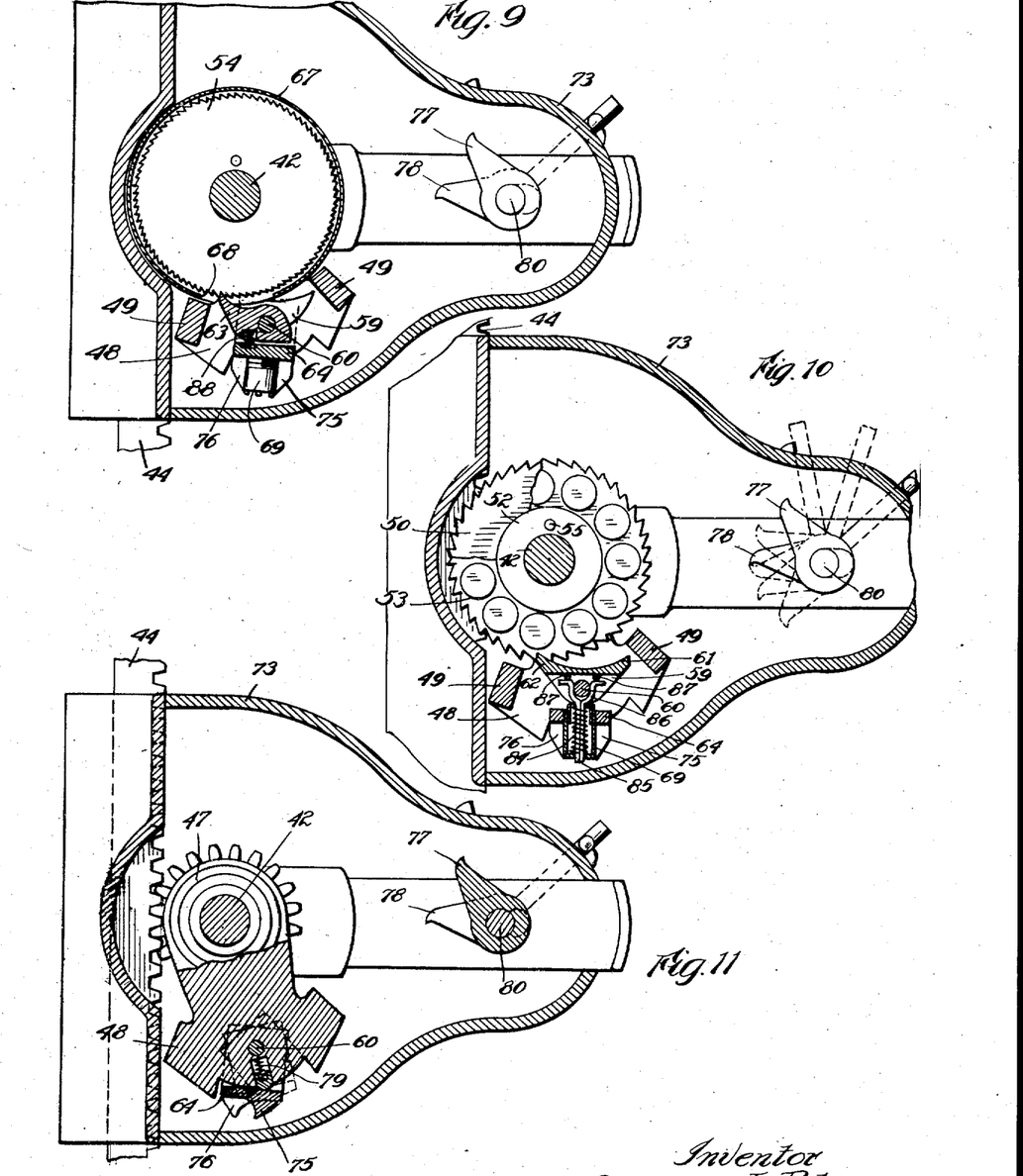
Fig. 9 is a horizontal section taken on the line 9—9 of Fig. 6.
Fig. 10 is a horizontal section taken on the line 10—10 of Fig. 6.
Fig. 11 is a horizontal section taken on the line 11—11 of Fig. 6.

The driving pawls 62 and 61 for the main and return actuators are pivotally mounted within the carrier on said pin 60, these pawls being integrally formed on a block 59 normally held in a neutral position relative to the carrier by means of a spring detent 69 (Fig. 10). The carrier in turn is held in an intermediate or neutral position, or on either side of such neutral position, by means of a spring detent 79 (Fig. 11).

The main and return actuators may therefore be selectively rendered operative by shifting the carrier to rotate the feed screw in a direction to lower the saw frame or in a direction to raise the saw frame. In the lowering or feeding operation, the carrier is shifted from its neutral position to the left (Fig. 9) and in the oscillation of the crank arm the driving pawl 62 engages the ratchet wheel 53 and through its frictional driving connection with the ratchet wheel 50 fast on the feed screw, the latter is turned in a direction to lower the saw frame. Similarly by shifting the carrier to the opposite side of such neutral position the pawl 61 becomes effective to engage the oppositely inclined teeth of the ratchet wheel 50 and thus elevate the saw frame.

The spring detent 69 for holding the driving pawls 62 and 61 in proper relation to the carrier, but permitting of slight yielding movement in either direction from a central position, preferably comprises a single spring 84 (Fig. 10). This spring is coiled about a stem 85 slidable in the carrier radially of the pivot pin 60 and having a yoke 86 straddling the pin and engaging at its free ends with bearing pins 87 carried by the pawl block 59.

The auxiliary actuator comprises in the preferred embodiment a ratchet wheel 54 and a driving pawl 63 therefor. Said ratchet wheel has a loose fit on the feed screw but is connected for positive actuation of the screw by a pin 55 carried by the hub of the ratchet wheel 50 of the return actuator. Thus, in the present instance, the ratchet wheel of the main actuator is interposed between the ratchet wheel 50 of the return actuator and the ratchet wheel 54 of the auxiliary actuator, and a frictional driving connection is provided between said intermediate ratchet wheel and the other two ratchet wheels. The frictional engagement thus provided is made variable by a spring 57 coiled about the upper end of the feed screw and bearing between the ratchet wheel 54 and an adjustable nut 58 on the feed screw.

The driving pawl 63 for the auxiliary actuator is pivotally mounted in the carrier 64 on the pivot pin 60 thereof and above the pawl for the main actuator. The pawl 63 thus has the same range of movement as the pawl for the main actuator. Said pawl 63 is yieldably held by a spring 88 in a predetermined relation to the driving pawl of the main actuator, so that when the carrier is shifted into position to render the latter pawl active, the pawl 63 of the auxiliary actuator also tends to become active. Means is provided, however, for limiting the engagement of the pawl 63 with the auxiliary ratchet wheel 54 to a predetermined range of movement at the end of each operative stroke of the crank arm 48, to the end that the auxiliary actuator shall be effective to impart only a relatively small amount of feeding motion to the feed screw. This means comprises (Fig. 6) a control device in the form of an annular guard ring encircling the ratchet wheel 54, being in the form of a flange 67 depending from a disk which encircles the feed screw 42. During the major portion of the reciprocatory movement of the pawl carrier, the pawl 63 is arranged to slide upon the periphery of said guard ring (assuming the carrier to be in the down feeding position as in Fig. 9), but toward the end of said stroke the pawl is free to move under the action of its spring 88 through a slot 68 in the guard ring and hence into engagement with its ratchet wheel.

In order to vary the point at which the auxiliary driving pawl becomes effective and thereby determine the extent of motion imparted to the feed screw, the guard ring 67 is arranged for circumferential adjustment. This is accomplished by providing a radially extending flange 70 on one side of the guard ring overlying a stationary arcuate member 89 and carrying a handle 71. The member 89 carries a pin 74 extending through an arcuate slot in the flange 70, the pin being provided with a head and an interposed spring 99 tending to hold the guard ring in adjusted position. A scale 72 may be provided on the arcuate member 89 for use in connection with a suitable point on the flange to indicate the adjustment necessary to effect varying amounts of feed by the auxiliary actuator.

The arcuate member 89 may form a part of a stationary housing 73 enclosing the pawl and ratchet mechanism and made of suitable shape to permit the oscillation of the pawl carrier.

Figure 6:
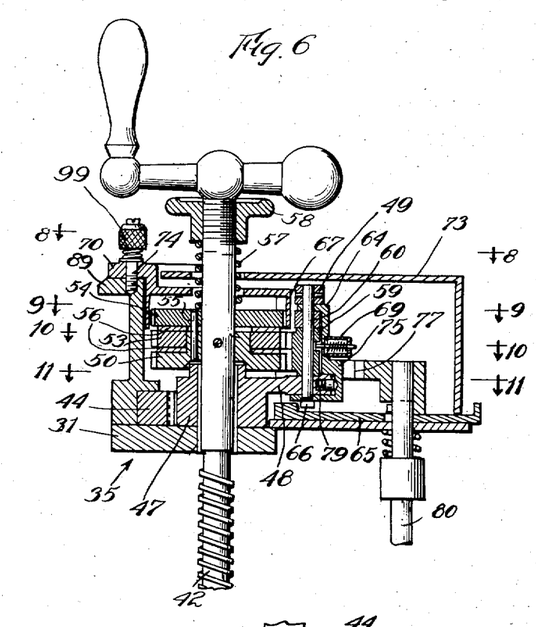
Fig. 6 is a vertical section through the feeding mechanism taken on the line 6—6 of Fig. 8.
Figure 7:
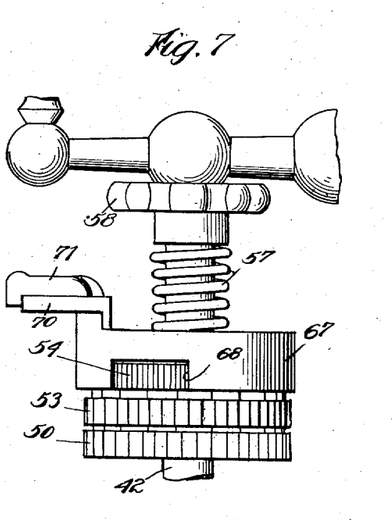
Fig. 7 is an elevation of a portion of the feeding mechanism.
Figure 8:
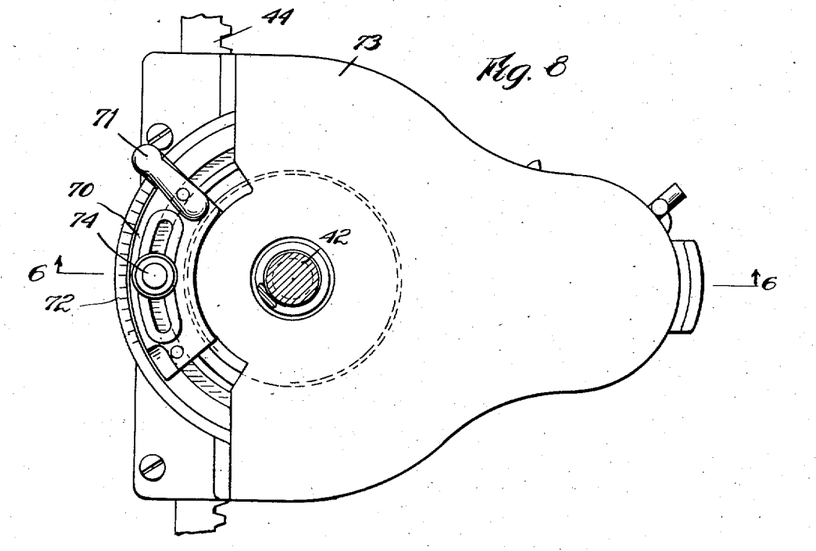
Fig. 8 is a horizontal section taken on the line 8—8 of Fig. 6.

When desired, the pawl carrier 64 may be locked in its neutral position by means of a slide 65 (Fig. 6) mounted in the housing 73 and movable into engagement with a pair of spaced projections 66 (one only being shown in Fig. 6).

It will thus be apparent that at the beginning of the cutting stroke of the saw, the ratchet wheel 53 alone is rotated by its pawl 62, the pawl 63 being prevented from coacting with its ratchet wheel 54 by the guard ring 67. This rotation is adapted to give the saw a large feeding movement but, when a predetermined resistance is offered to such feeding movement, the frictional connection between the ratchet wheel 53 and the other two ratchet wheels will slip.

Near the end of each cutting stroke, the downward feeding pressure exerted through the ratchet wheel 53 is augmented by the ratchet wheel 54 which at that time is actuated by its pawl 63, and the screw is positively rotated thereby to insure a predetermined minimum depth of penetration of the saw on each cutting stroke.

The means for swinging the member 64 to shift the pawls from one position to another is like that in my said prior machine. It comprises briefly two lugs 75 and 76 (Fig. 11) formed on the lower part of the member 64, and adapted to contact respectively with fingers 77 and 78 fast on the upper end of a shaft 80 journaled in the casing 73 and extending downwardly parallel to the upright 31. The shaft 80 is adapted to be rotated to bring the projections 77 or 78 into the path of the lugs 75 or 76 as the arm 48 is oscillated, and thereby swing the carrier 64, and means is provided for rotating the shaft 80 automatically and thereby reversing the direction of movement of the saw frame by the feed mechanism at both the upper and lower limits of such movement. This means comprises, as in the prior machine, a pair of dogs 81 and 82 (see Fig. 1) adjustably mounted on the bracket 32 and adapted to contact with a lug 83 mounted on the shaft 80.

Counterbalancing means

Figures 3, 4, 5:
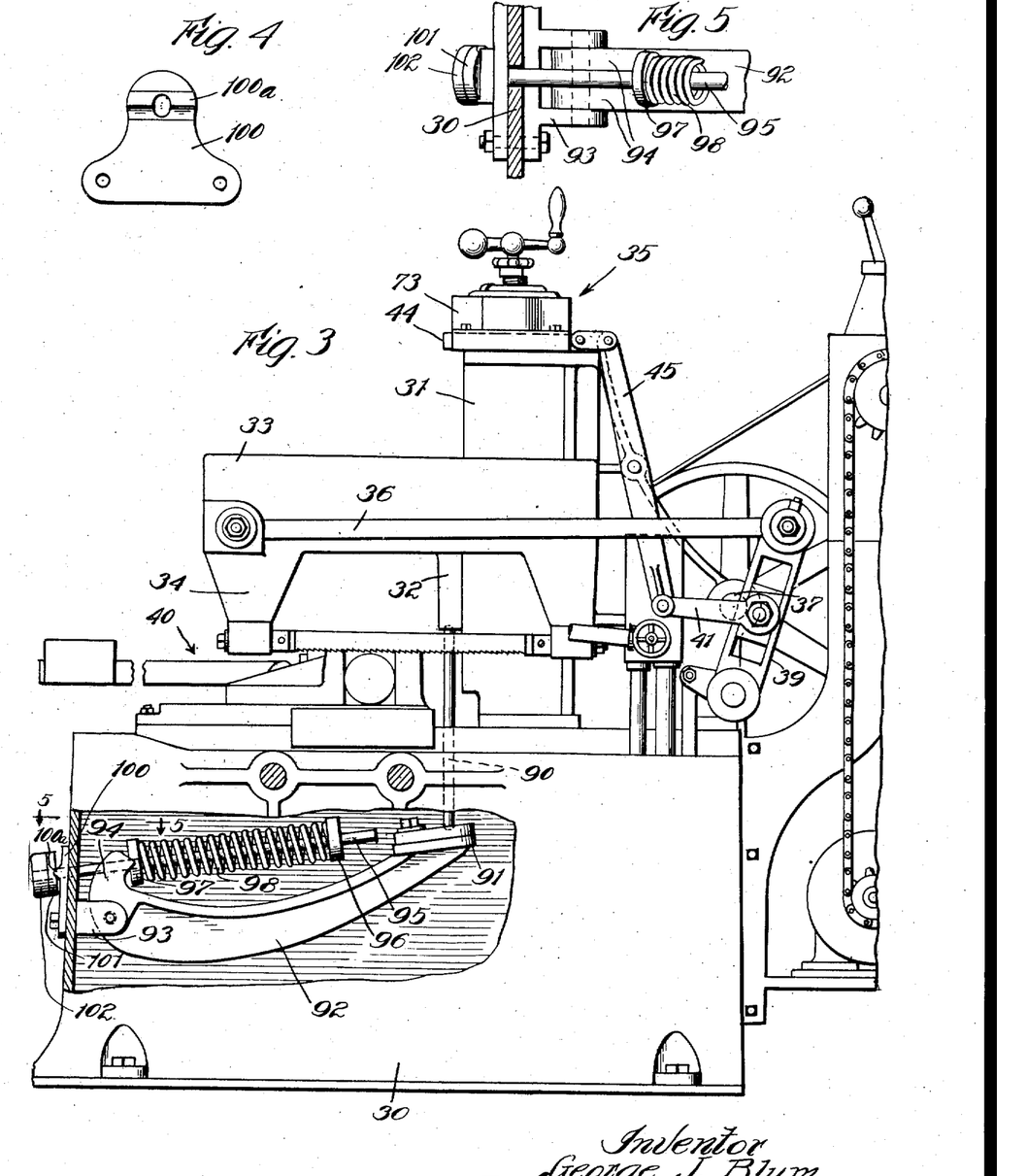
Fig. 3 is a front elevation of the machine.
Fig. 4 is a face elevation of a portion of the counterbalancing means.
Fig. 5 is a fragmentary sectional view taken along the line 5—5 of Fig. 3.

To make the vertical movement of the saw smooth and the feeding mechanism 35 completely responsive to the resistance offered to the saw, means have been provided to counterbalance the weight of the bracket 32 and the saw frame 33. As shown in Figs. 3, 4 and 5, this means is made small and compact so that it may be enclosed within the base 30 and to this end a rod 90 depends from the lower end of the bracket 32 and into the base. The lower end of the rod 90 rests on a pad 91 formed on one arm 92 of a bell crank which is horizontally pivoted within the base 30 by means of a bracket 93 attached to the side thereof. The other arm 94 of the bell crank, which is relatively short, is bifurcated to receive a rod 95 pivotally supported at one end in the base and having a nut 96 threaded on its inner end. A collar 97 is slidably mounted upon the rod adjacent the arm 94, and a compression spring 98 surrounds the rod 95 between the nut 96 and the collar 97. Preferably the bifurcated arm 94 of the bell crank terminates in a sharp point bearing in a groove in the face of the collar 97, and the outer end of the rod 95 is pivotally supported on the base by means of a plate 100 having ribs 100ª fitting in a groove in a nut 101 threaded and locked to the rod 95 by a second nut 102. The tension of the spring 98 may be readily adjusted by the nut 96 and it will be seen that the arrangement provides an effective counterbalance through the use of a relatively small spring.

When the feeding mechanism 35 causes the bracket 32 to move downwardly, the rod 90 pushes down on the long arm 92 of the bell crank and the short arm 94 compresses the spring 98, the long arm 92 accommodating the relatively long movement of the bracket, while the shorter movement of the short arm 94 is sufficient to compress the spring. Thus, the weight of the bracket 32 and the saw frame 33 will be counterbalanced by the spring 98, and the feeding mechanism 35 is freed of the effect of the weight of the bracket 32 and the saw frame 33 and will be completely responsive to the conditions of cutting.

Limiting stop means

In the event that the means provided for automatically reversing the feeding mechanism 35 should, for any reason, fail to act, damage to the machine through a continuation of the feeding movement beyond such limits is prevented by a limiting stop means comprising a pair of dogs 121 and 122 permanently fixed to the side of the bracket 32. Said dogs are positioned so that when the maximum normal range of movement of the frame is exceeded in either direction one of the dogs will engage with a lug 123 mounted on a control shaft 124. The latter is mounted parallel to the upright 31 and has an arm 126 fixed thereto and connected to a switch 129. Thus, when either the dog 121 or the dog 122 strikes the lug 123, the switch will be opened to stop the machine.

Single cut control

In order that the machine may be set to effect a single cut through a piece of stock and then stop automatically, I provide a dog 130 (Fig. 2) pivoted at its upper end on the feed reverse dog 81 and having a pivoted latch device 133 adapted to hold the dog in inoperative relation to the stop member 123 on the control shaft 124. The dog 130 when released by its latch 133 is moved by gravity into a position in operative relation to said stop member. The shape of the dog, however, is such that in the upward travel of the frame the nose of the dog engages the stop member so that the dog is cammed thereby without affecting the position of the stop member. When, however, the feed mechanism has been reversed and the saw frame started down, the nose of the dog 130 engages the stop member 123 and is positively held against further pivotal movement by a stop 132 formed on the dog 81, thus rocking the shaft 124 and stopping the machine.

Thus it will be apparent that upon the completion of one cycle comprising a downward feeding movement and an upward withdrawing movement, the dog 130 becomes effective near the beginning of the succeeding downward movement to stop the machine, thus leaving the machine in down feeding position for the next cut. It will be understood in this connection that the dog is manually released from its latch device after passing the stop member 123 in the approach of the saw to the work.

Work holding means

Figures 1, 2:
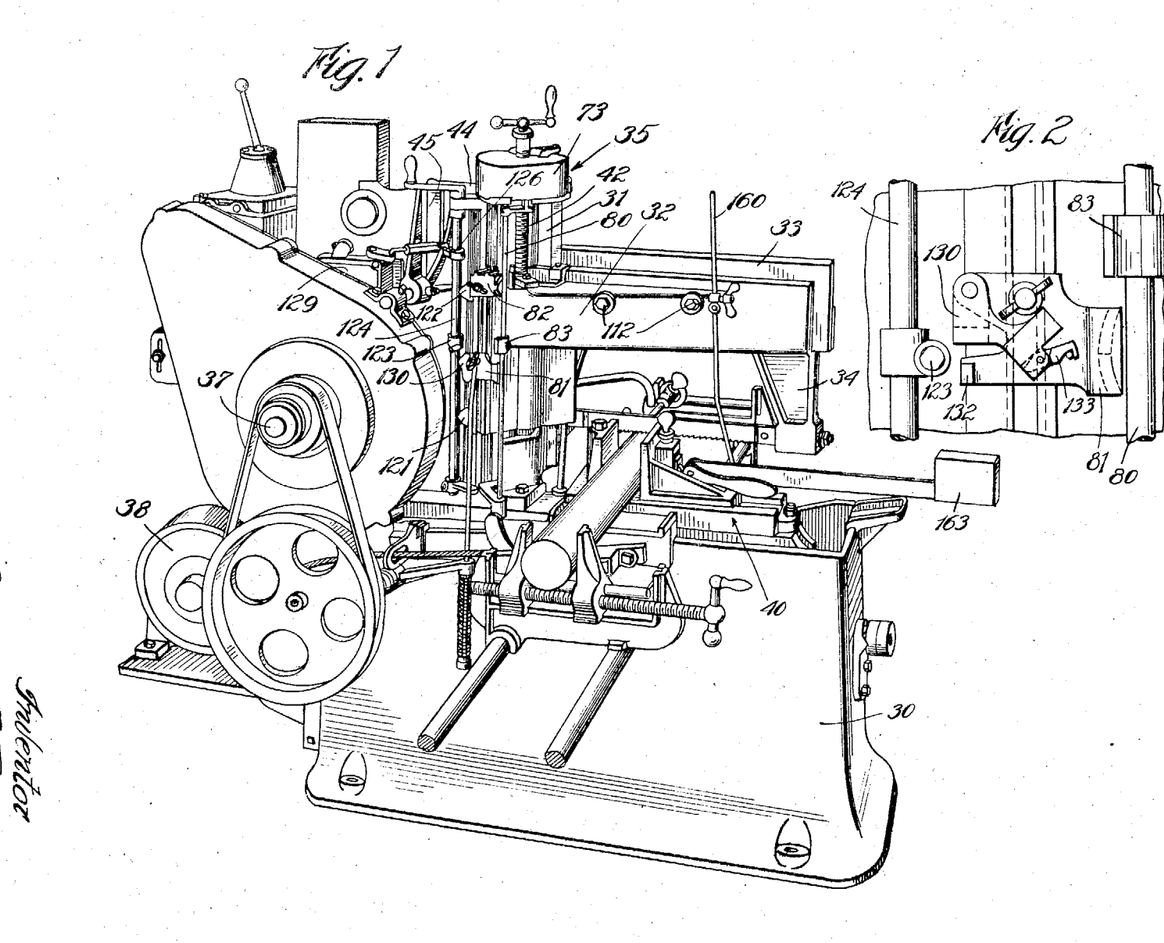
Figure 1 is a perspective view of a machine embodying the features of the invention.
Fig. 2 is an enlarged fragmentary elevation of the means for stopping the machine after taking a single cut.
Figures 12, 16:
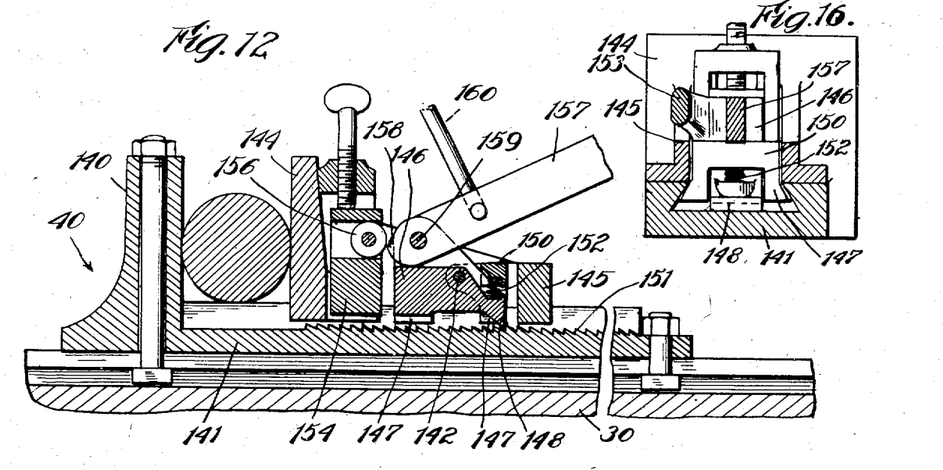
Fig. 12 is a vertical section through the work-holding vise with the parts in an unlocked position.
Fig. 16 is a vertical section taken on the line 16—16 of Fig. 14.

The work holding vise 40 while generally similar in construction to that of the vise disclosed in my said patent, embodies improved means for manipulating the same to clamp and release the work. Generally stated, the device comprises a stationary jaw 140 formed integral with one end of an elongated base plate 141, and adjustably secured upon the base of the machine as shown in Figs. 1 and 12. Coacting with the stationary jaw is a movable jaw 144 which is formed integral with an open approximately rectangular frame 145 overlying the plate 141. The movable jaw has an interfitting adjustable connection with the stationary jaw through the medium of dove-tail grooves formed at opposite sides of the base plate 141 of the stationary body and laterally extending tenons on the lower side edges of the frame of the movable jaw; and within this frame is a locking device coacting with the base plate of the stationary jaw and acting upon the movable jaw to hold it in clamping relation to the work. Said locking means as herein shown is of an improved character designed to facilitate the adjustment of the movable jaw preparatory to the insertion of a piece of work between the jaws and also to simplify the locking operation.

Figure 13:
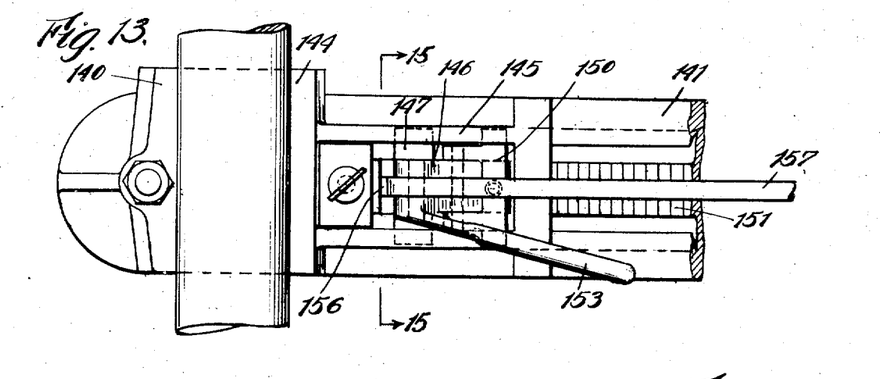
Fig. 13 is a plan view of the vise.
Figures 14, 15:
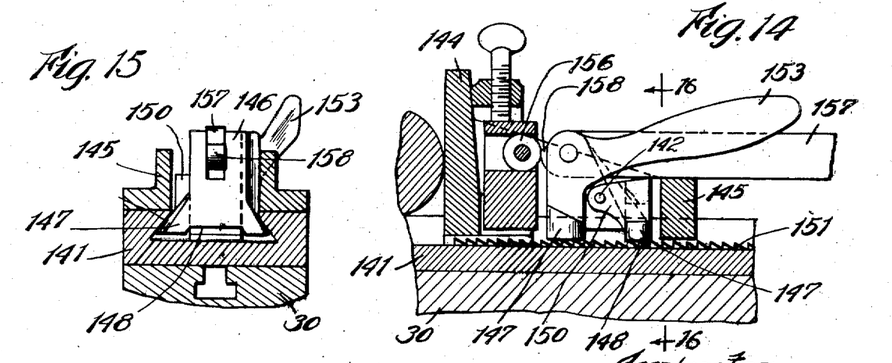
Fig. 14 is a fragmentary vertical section of the vise showing the parts in a locked position.
Fig. 15 is a vertical section taken on the line 15—15 of Fig. 13.

In its preferred form this locking device is in the form of a dog constructed in two parts of which 146 designates a dogging member and 150 a controlling member. The dogging member is in the form of a block having a toe 148 adapted to engage with the teeth of a ratchet toothed rack 151 formed on the upper surface of the base plate 141 of the stationary jaw, and the controlling member is in the form of a yoke (Figs. 13 and 16) straddling the dogging member and pivoted thereto as at 142. Both of the members have laterally extending tenons 147 loosely engaging in the dovetail grooves at opposite side edges of the base plate 141 of the stationary jaw. A spring 152 interposed between the yoke member and the dogging member yieldable urges the latter into engagement with the teeth of the rack 151, the yoke member being for this purpose held against upward movement by the engagement of its tenons in the dovetail grooves on the base plate.

The two part locking device thus constructed is of a length such as to be capable of a limited relative movement in the frame of the movable jaw, as shown in Fig. 12, and means similar to that employed in my prior machine is provided on the locking device to force the movable clamping jaw against the work when the dogging member engages with a tooth of the rack. Said means comprises a cam member 158 formed on the end of a lever 157 which is pivoted on the dogging member at 159, the cam member being movable into engagement with a roller follower 156 adjustably mounted on the movable clamping member.

The lever 157 carries at its free end a weight 163 (Fig. 1) normally operating to hold the lever downwardly against a stop formed by the frame member 145 of the movable jaw, and when in engagement with said stop the lever is adapted to engage with said yoke member to force it downwardly and through the medium of the spring 152 to urge the dogging member forcibly into engagement with the rack 151. Upon raising the lever 157, the tension on the spring 152 may be removed and the dogging member may be swung manually as through the medium of a hand lever 153 rigid therewith, for the purpose of disengaging the dogging member from the rack.

Thus, in the elevation of the lever, the movable jaw releases its grip on the work and permits the dogging member to be operated by the hand lever out of holding relation with the rack 151 so that the movable jaw may be slid manually away from the work. Conversely, in clamping a piece of work between the two jaws it is only necessary after inserting the work in position to raise the lever 153 and slide the movable jaw against the work. The desired clamping action is then effected by a mere release of the weighted lever, which through its cam engagement with the follower 156 actuates the movable jaw relative to the locking device which at that time engages with the rack.

The release of the work automatically for the purpose of feeding the same, as set forth in my said patent, may be effected in the manner therein disclosed by operating the lever 157 through the medium of a link 160 connected with the bracket 32 so as to be operable upon the withdrawal of the saw from the work.

Summary of operation

When a given piece of stock is to be cut it is placed between the jaws of the vise 40 and quickly clamped in position by raising the weighted lever 157 and applying thereto a force such as to slide the movable jaw against the work. Release of the lever effects a rigid clamping of the work through the operation of the cam 158 and the dogging member 146.

Assuming the motor 38 to be in operation with the saw frame and the rack bar reciprocated by reason of their connections with the shaft 37, the pawl carrier 64 of the feed mechanism is shifted manually to the left (Fig. 10) to initiate the downward feeding operation. In the initial approach of the saw to the work the saw frame is rapidly fed downwardly through the operation of the main actuator having a relatively large effective stroke; and after the saw engages the work the extent of feeding movement by the main actuator varies according to the resistance offered by the work and the condition of the saw blade.

Near the end of each cutting stroke of the saw the auxiliary actuator becomes effective to augment the feeding pressure exerted by the main actuator. The point in the stroke at which the auxiliary actuator shall thus become effective is determined by the adjustment of the guard ring, by its handle 71, but it will be apparent that in any event the auxiliary actuator is capable of insuring a predetermined depth of penetration in each stroke of the saw.

The mounting of the saw frame through the medium of antifriction bearings and the counter-balancing of the head is advantageous from the standpoint of efficiency and accuracy of control under the varying conditions encountered.

Upon the completion of a cut, the direction of feeding movement is automatically reversed and the saw returned by the operation of the return actuator alone. As the saw frame approaches the upper limit of its movement the work is released and repositioned for a new cut which is automatically initiated by the shifting of the pawl carrier to the down-feeding position.

In the event that a single cut only is to be made, the machine is stopped near the beginning of the down-feeding cycle by the operation of the dog 130, the same having been set in operative position during the previous downward feeding cycle.

I claim as my invention:—

1. In a power hacksaw, means for feeding the saw to the work comprising, in combination, a screw, a first ratchet wheel secured to the screw for imparting to the saw a positive feeding movement, a second ratchet wheel frictionally engaging said first ratchet wheel for imparting to the saw a variable feeding movement, a pair of pawls for coacting with the respective ratchet wheels, means for simultaneously oscillating said pawls in an operative direction during the entire cutting stroke of the saw, a guard member partially surrounding said first ratchet wheel to prevent the pawl from operating said first ratchet wheel during the first part of said cutting stroke but permitting said pawl to operate said first ratchet during the latter part of said cutting stroke, and means for adjusting the position of said member relative to the oscillation of said pawls to adjust the amount of positive feeding of the saw in each cutting stroke.

2. In a power hacksaw, means for feeding the saw to the work comprising, in combination, a screw, a disk fixed to said screw, a first ratchet wheel secured against rotation relative to said disk but slidable axially thereof, a second ratchet wheel interposed between said first ratchet wheel and said disk and having frictional driving contact therewith, and means for rotating said second ratchet wheel during the entire cutting stroke of the saw and for rotating said first ratchet wheel during the latter part of said cutting stroke.

3. In a power hacksaw, means for feeding the saw to the work comprising, in combination, a screw, a first ratchet wheel secured to the screw for imparting to the saw a positive feeding movement, a second ratchet wheel frictionally engaging said first ratchet wheel for imparting to the saw a variable feeding movement, a pair of pawls for coacting with the respective ratchet wheels, means for simultaneously oscillating said pawls in an operative direction during the entire cutting stroke of the saw, and a member interposed between said first ratchet wheel and its pawl for preventing contact of said pawl with said ratchet wheel during the first part of said cutting stroke, said member permitting contact between said first ratchet wheel and its pawl during the latter part of said cutting stroke.

4. In a power hacksaw, means for feeding the saw to the work comprising, in combination, a screw, a first ratchet wheel secured to the screw for imparting to the saw a positive feeding movement in a given direction, a second ratchet wheel frictionally engaging said first ratchet wheel for imparting to the saw a variable feeding movement in the same direction, a pair of pawls for coacting with the respective ratchet wheels, means for oscillating said pawls in an operative direction during the entire cutting stroke of the saw, and means for preventing the coaction of said first ratchet wheel with its pawl during a part of said cutting stroke.

5. In a power hacksaw, means for feeding the saw to the work comprising, in combination, a screw, a first ratchet wheel secured to said screw for withdrawing the saw from the work, a second ratchet wheel secured against rotation relative to said first ratchet wheel for imparting to the saw a positive feeding movement, a third ratchet wheel interposed between and frictionally engaging said first and second ratchet wheels and yieldable axially relative thereto for imparting to the saw a variable feeding movement, means for operating said ratchets, and means for varying the friction between ratchet wheels.

6. In a power hacksaw, means for feeding the saw to the work comprising, in combination, a screw, a first ratchet wheel secured to said screw for withdrawing the saw from the work, a second ratchet wheel secured against rotation relative to said first ratchet wheel for imparting to the saw a positive feeding movement, a third ratchet wheel frictionally coacting with said first and second ratchet wheels for imparting to the saw a variable feeding movement, and means for operating said ratchets.

7. In a power hacksaw, means for feeding the saw to the work comprising, in combination, a screw, a first ratchet wheel secured to said screw for imparting to the saw a feeding movement of a predetermined amount, a second ratchet wheel frictionally coacting with said first ratchet wheel for imparting to the saw a variable feeding movement in the same direction, and means for operating said ratchet wheels.

8. In a power hacksaw, means for feeding the saw to the work comprising, in combination, means for imparting to the saw a positive feeding movement during the cutting stroke of the saw, means for imparting to the saw a variable feeding movement during said cutting stroke, and means connected with said positive feeding means for withdrawing the saw from the work at the completion of a cut, said variable feeding means being frictionally connected with said positive feeding means and said withdrawing means.

9. In a power hacksaw including a saw having a reciprocating movement comprising a cutting stroke and a return stroke, means for feeding the saw to the work comprising, in combination, means for imparting to the saw a positive feeding movement of a predetermined amount during a part of the cutting stroke of the saw, and means including a separate feed element in driving relation with said positive feeding means for imparting to the saw a variable feeding movement during said cutting stroke.

10. In a power hacksaw, means for feeding the saw to the work comprising, in combination, means for imparting to the saw an automatically variable feeding movement, means for imparting to the saw a positive feeding movement of a predetermined amount during a part of the time when said variable feeding means is acting, and means connected with said positive feeding means for withdrawing the saw from the work.

11. In a power hacksaw including a saw having a reciprocating movement comprising a cutting stroke and a return stroke, means for feeding the saw to the work comprising, in combination, means for imparting to the saw an automatically variable feeding movement during a cutting stroke of the saw, means for imparting to the saw a positive feeding movement of a predetermined amount during a part of said cutting stroke, and means for adjusting the part of said cutting stroke during which said positive feeding means acts.

12. In a power hacksaw including a saw having a reciprocating movement comprising a cutting stroke and a return stroke, means for feeding the saw to the work comprising, in combination, means for imparting to the saw an automatically variable feeding movement during a cutting stroke of the saw, and means for imparting to the saw a feeding movement of a predetermined amount during the latter part of said cutting stroke.

13. In a power hacksaw including a saw having a reciprocating movement comprising a cutting stroke and a return stroke, means for feeding the saw to the work comprising, in combination, means for imparting to the saw an automatically variable feeding movement in a given direction, and means for imparting to the saw a feeding movement of a predetermined amount in the same direction forming a continuation of said variable movement.

14. In a power hacksaw including a saw having a reciprocating movement comprising a cutting stroke and a return stroke, means for feeding the saw to the work comprising, in combination, means for imparting a positive feeding movement to the saw in a given direction, and additional means for imparting an automatically variable feeding movement to the saw in the same direction.

15. In a power hacksaw, the combination of a saw support, a screw operatively associated with said support, a first means having a positive connection with said screw for rotating it in one direction, a second means having a positive connection with said first means for rotating the screw in the opposite direction, and a third means interposed between said first and second means and having a frictional connection with said first and second means for rotating the screw in the same direction as said second means.

16. In a power hacksaw, the combination of a saw support, a screw operatively associated with said support, and power-driven means having both a positive and a yieldable connection with the screw for rotating the latter in one direction while the saw is in cutting engagement with the work and a positive connection for rotating the screw in the other direction.

17. In a power hacksaw including a saw having a reciprocating movement comprising a cutting stroke and a return stroke, the combination of a saw support, a screw operatively associated with said support for feeding the saw through the work, and power-driven means having both positive and frictional slip connections with the screw for rotating the latter during the cutting stroke.

18. In a power hacksaw, the combination of a movable support for the saw, reversing the direction of movement, mechanism for moving said support including a yieldable actuator tending to impart a large feeding movement, and an auxiliary actuator for augmenting the feeding pressure to insure a minimum depth of penetration of the saw during each cutting stroke.

19. In a power hacksaw, a feeding mechanism comprising, in combination, means for imparting a feeding movement of a predetermined pressure during a cutting stroke of the saw, and means operable at a predetermined point in the cutting stroke for augmenting the feeding pressure.

20. A power hacksaw comprising, in combination, a saw, a support for said saw, means for horizontally reciprocating said saw on said support, means for automatically moving said support through a cycle comprising feeding the saw through the work, reversing the direction of movement, withdrawing the saw therefrom, and reversing the direction of movement, and automatic means capable of being set prior to the start of a cycle and operated by the movement of said support for stopping said reciprocating means and said moving means at the completion of one cycle, said stopping means being constructed to be moved to and maintained in an inoperative position to permit a continuous repetition of said cycle.

21. A power hacksaw comprising, in combination, a saw, means for horizontally reciprocating said saw, means for automatically moving said saw up and down, and means capable of being set prior to the start of a cycle and automatically operated by the vertical movement of said saw to stop both said reciprocating means and said moving means shortly after the beginning of the downward movement.

22. A power hacksaw comprising, in combination, a saw, means for horizontally reciprocating said saw, means for automatically moving said saw vertically through a cycle comprising a downward feeding movement and an upward withdrawing movement, and means capable of being set prior to the start of a cycle and automatically operated by the vertical movement of said saw to stop both said reciprocating means and said moving means shortly after the beginning of the next cycle.

23. In a power hacksaw, the combination of a saw support, a screw operatively associated with said support, a first ratchet having a positive connection with said screw for rotating the screw in a given direction, a second ratchet having a frictional slip connection with said screw for rotating the latter in the same direction, a third ratchet having a positive connection with said screw for rotating it in the other direction, and an oscillating means for driving said ratchets.

24. In a power hacksaw, the combination of a saw support, a screw operatively associated with said support, a first member having a positive connection with said screw for rotating the screw in a given direction, a second member having a frictional slip connection with said screw for rotating it in the same direction, a third member for rotating the screw in the other direction, and an oscillating means selectively operable for driving said first and second members when moving in one direction and for driving said third member when moving in the other direction.

25. In a power hacksaw, the combination of a saw frame having a reciprocating movement comprising a cutting stroke and a return stroke, means for reciprocating the frame, and a feed mechanism comprising means operable automatically during the cutting stroke of the frame to exert a yielding feeding movement of relatively large amplitude during a substantial portion of said stroke, and means operable automatically during the cutting stroke to exert a positive feeding movement during the remainder of said stroke.

26. In a power hacksaw, the combination of a movable support for the saw, and mechanism for moving said support including a rotary element, two movable actuators for rotating said element in the same direction and having the same range of movement, and a control device for one of the actuators determining the extent of its effective operation.

27. In a power hacksaw, the combination of a movable support for the saw, and mechanism for moving said support including a rotary element, two movable actuators for rotating said element in the same direction, and means for limiting the effective range of movement of one of said actuators to less than the movement of the other of said actuators.

GEORGE J. BLUM.

CERTIFICATE OF CORRECTION.

Patent No. 1,972,327. September 4, 1934.

GEORGE J. BLUM.

It is hereby certified that error appears in the printed specification of the above numbered patent requiring correction as follows: Page 2, line 5, for "1,919,232" read 1,919,323; page 6, lines 69 and 70, claim 18, strike out the words "reversing the direction of movement" and insert the word and; and that the said Letters Patent should be read with these corrections therein that the same may conform to the record of the case in the Patent Office.

Signed and sealed this 9th day of October, A. D. 1934.

(Seal)

Leslie Frazer
Acting Commissioner of Patents.

ing movement during the remainder of said stroke.

26. In a power hacksaw, the combination of a movable support for the saw, and mechanism for moving said support including a rotary element, two movable actuators for rotating said element in the same direction and having the same range of movement, and a control device for one of the actuators determining the extent of its effective operation.

27. In a power hacksaw, the combination of a movable support for the saw, and mechanism for moving said support including a rotary element, two movable actuators for rotating said element in the same direction, and means for limiting the effective range of movement of one of said actuators to less than the movement of the other of said actuators.

GEORGE J. BLUM.

CERTIFICATE OF CORRECTION.

Patent No. 1,972,327.                                September 4, 1934.

GEORGE J. BLUM.

It is hereby certified that error appears in the printed specification of the above numbered patent requiring correction as follows: Page 2, line 5, for "1,919,232" read 1,919,323; page 6, lines 69 and 70, claim 18, strike out the words "reversing the direction of movement" and insert the word and; and that the said Letters Patent should be read with these corrections therein that the same may conform to the record of the case in the Patent Office.

Signed and sealed this 9th day of October, A. D. 1934.

(Seal)                                           Leslie Frazer
                                                       Acting Commissioner of Patents.